Patented Dec. 19, 1939

2,183,871

UNITED STATES PATENT OFFICE 2,183,871

DYESTUFFS OF THE NAPHTHALENE SERIES

Rudolf Robl, Ludwigshafen-on-the-Rhine, Germany, assignor to General Aniline Works, Inc., New York, N. Y., a corporation of Delaware No Drawing. Application March 1, 1938, Serial No. 193,289. In Germany March 4, 1937

2 Claims. (Cl. 260—396)

The present invention relates to dyestuffs of the naphthalene series.

In my copending application Ser. No. 193,288, filed March 1, 1938, I have described that the so-called naphthazarine intermediate product (cf. Berichte der Deutschen Chemischen Gesellschaft, vol. 4, page 439) exists in two isomeric forms depending on the method used for its preparation. Most probably, these two forms differ in the position of the double bonds. I have further described that this difference becomes evident from an investigation of the form of the crystals which are obtained by treating the naphthazarine intermediate product obtained according to one of the methods described in the German Patents Nos. 101,371, 108,551 and 111,683 with sodium hydrosulphite in a 10 per cent sodium carbonate solution. Finally I have described in my said copending application that the kind of naphthazarine intermediate product obtainable according to the German Patent 111,683 may also be obtained by increasing the pH value of the solution obtained by the reduction of the 1,5-dinitronaphthalene in sulphuric acid and dilution with water. According to the process described in my said copending application new valuable dyestuffs suitable for dyeing cellulose esters and ethers are formed by the action of both kinds of naphthazarine intermediate product in the presence of sodium hydrosulphite or a similar reducing agent on para-aminophenolbenzyl ethers.

I have now further found that the two isometric forms of the naphthazarine intermediate product may also be converted into valuable compounds suitable for dyeing cellulose esters and ethers by reacting it in the presence of a reducing agent such as sodium hydrosulphite in an alkaline solution with aliphatic, aliphatic-aromatic or cycloaliphatic amines. Generally speaking, the reaction products contain derivatives of the naphthazarine intermediate product containing one or several radicals of the amine employed. The mixtures of dyestuffs obtained according to the present process are especially suitable for dyeing cellulose esters and ethers.

The following examples will further illustrate how the said invention may be carried out in practice but the invention is not restricted to these examples. The parts are by weight.

Example 1

A suspension of 30 parts of the naphthazarine intermediate product obtained by increasing the pH value of the blue sulphuric acid solution of the reduction product of 1,5-dinitronaphthalene in 600 parts of 10 per cent sodium carbonate solution is heated for about 5 minutes with 30 parts of sodiumhydrosulphite while stirring at 50° C. in an open vessel. After the additon of 30 parts of normal-butylamine the mixture is further stirred at 50° C. for 15 minutes. Then 5 parts of 25 per cent sodiumhydroxide solution are added and air is led through the mixture for some time. It is then acidified by means of acetic acid, the resulting compound is filtered off by suction and dried, if desired under reduced pressure. The blue-black powder thus obtained dissolves very readily in alcohol, acetic acid ethyl ester or pyridine giving a clear blue solution and in concentrated sulphuric acid giving a brown-yellowish coloration. It may be used with advantage for dyeing cellulose esters and ethers giving greenish blue shades of color.

Instead of normal-butylamine isobutylamine may be employed. Similarly, other aliphatic amines of different molecular weight may be used such as propylamines, or higher molecular alkylamines, as for example hexylamine, decylamine or dodecylamine.

Example 2

5 parts of an about 40 per cent paste of the naphthazarine intermediate product prepared for example according to the German Patent No. 108,551 are mixed with 50 parts of 10 per cent sodium hydroxide solution and 5 parts of sodium hydrosulphite. The mixture is then heated at about 30° C. and carbon dioxide is led through until a sample of the mixture does not change its color to blue when shaken with air. The orange-yellow crystals separating from the brown solution are then filtered off by suction and washed with water.

2 parts of the reduction compound thus obtained are then treated for from 2 to 3 hours with 10 parts of 30 per cent methylamine solution in the presence of air. The mixture is then diluted with water, acidified by means of acetic acid and the precipitate is filtered off by suction, washed and dried. It dissolves in organic solvents giving a green-blue coloration and may be used for dyeing cellulose esters and ethers.

Similar end products are obtained by employing ethylamine, cyclohexylamine or benzylamine instead of methylamine.

What I claim is:

1. A new coloring matter for dyeing cellulose esters and ethers prepared by condensation of the naphthazarine intermediate product with primary amines selected from the class consisting of alkylamines, aralkylamines and cycloalkylamines in the presence of a reducing agent, and oxidizing the leuco compounds formed.

2. A new coloring matter for dyeing cellulose esters and ethers prepared by condensation of the naphthazarine intermediate product with normal butylamine in the presence of a reducing agent, and oxidizing the leuco compound formed.

RUDOLF ROBL.